United States Patent
Yu et al.

(10) Patent No.: US 12,386,141 B2
(45) Date of Patent: Aug. 12, 2025

(54) OPTICAL ELEMENT DRIVE MECHANISM

(71) Applicant: TDK TAIWAN CORP., Taoyuan (TW)

(72) Inventors: Chen-Yu Yu, Taoyuan (TW);
Shao-Chung Chang, Taoyuan (TW);
Shih-Wei Hung, Taoyuan (TW);
Man-Ting Lu, Taoyuan (TW);
Sin-Hong Lin, Taoyuan (TW); Wei-Pin Chin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 711 days.

(21) Appl. No.: 17/554,313

(22) Filed: Dec. 17, 2021

(65) Prior Publication Data
US 2022/0196960 A1    Jun. 23, 2022

Related U.S. Application Data

(60) Provisional application No. 63/143,344, filed on Jan. 29, 2021, provisional application No. 63/127,746, filed on Dec. 18, 2020.

(51) Int. Cl.
*G02B 7/02* (2021.01)

(52) U.S. Cl.
CPC .............. *G02B 7/023* (2013.01); *G02B 7/026* (2013.01)

(58) Field of Classification Search
CPC . G02B 7/08; G02B 7/09; G02B 7/023; G02B 7/026; G02B 27/646; G03B 5/00; G03B 13/36
See application file for complete search history.

(56) References Cited

U.S. PATENT DOCUMENTS

| | | | | |
|---|---|---|---|---|
| 4,429,240 A | * | 1/1984 | Kishi | H02K 29/08 |
| | | | | 310/156.32 |
| 9,939,606 B2 | * | 4/2018 | Kim | G02B 27/0006 |

(Continued)

FOREIGN PATENT DOCUMENTS

| CN | 107267798 A | * | 10/2017 | | C22C 9/00 |
|---|---|---|---|---|---|
| EP | 3690508 A1 | * | 8/2020 | | G02B 26/02 |

(Continued)

OTHER PUBLICATIONS

Atlas Tech Note No. 11, 2010, pp. 1-4 [online], [retrieved Jul. 20, 2024], retrieved from the Internet <URL: https://www.atlassteels.com.au/documents/TN11-Magnetic_response_rev_July_2010.pdf>. (Year: 2010).*

(Continued)

*Primary Examiner* — Ephrem Z Mebrahtu
(74) *Attorney, Agent, or Firm* — MUNCY, GEISSLER, OLDS & LOWE, P.C.

(57) ABSTRACT

An optical element drive mechanism is provided. The optical element drive mechanism includes an immovable part, a movable part, a drive assembly, and a strengthening assembly. The movable part is connected to an optical element. The movable part is movable relative to the immovable part. The drive assembly drives the movable part to move relative to the immovable part. The strengthening assembly strengthens the driving force of the drive assembly. The strengthening assembly is close to the drive assembly.

20 Claims, 13 Drawing Sheets

(56) References Cited

U.S. PATENT DOCUMENTS

| | | | | |
|---|---|---|---|---|
| 2010/0276832 | A1* | 11/2010 | Hamana | C08K 3/08 |
| | | | | 264/126 |
| 2012/0140326 | A1* | 6/2012 | Takeda | H04N 23/687 |
| | | | | 359/554 |
| 2013/0088609 | A1* | 4/2013 | Shimizu | H04N 23/687 |
| | | | | 359/554 |
| 2015/0319346 | A1* | 11/2015 | Sekiguchi | H04N 23/57 |
| | | | | 348/349 |
| 2017/0038601 | A1* | 2/2017 | Fan | G02B 27/646 |
| 2018/0100987 | A1* | 4/2018 | Wu | G02B 7/10 |
| 2018/0180972 | A1* | 6/2018 | Sugiura | H04N 23/55 |
| 2018/0372988 | A1* | 12/2018 | Hu | G02B 7/09 |
| 2019/0011614 | A1* | 1/2019 | Park | G02B 7/09 |
| 2019/0107684 | A1* | 4/2019 | Osaka | G03B 13/36 |
| 2020/0012072 | A1* | 1/2020 | Wang | G06F 1/1686 |
| 2020/0183124 | A1* | 6/2020 | Lee | G03B 5/00 |
| 2020/0209439 | A1* | 7/2020 | Hu | G02B 3/14 |
| 2021/0063762 | A1* | 3/2021 | Kim | H04N 23/55 |
| 2022/0132003 | A1* | 4/2022 | Huang | F03G 7/0665 |

FOREIGN PATENT DOCUMENTS

| | | | | |
|---|---|---|---|---|
| GB | | 2197991 A * | 6/1988 | G11B 19/2009 |
| JP | | 2005308869 A * | 11/2005 | |
| JP | | 2010233432 A * | 10/2010 | |
| KR | | 101431182 B1 * | 8/2014 | |

OTHER PUBLICATIONS

Definitions on, 2019, pp. 1-11 [online], [retrieved Jul. 21, 2024], retrieved from the Internet <URL: https://web.archive.org/web/20181214110055/https://www.dictionary.com/browse/on>. (Year: 2019).*

Nicholas Mitchell, Camera Color Guide—Why Cameras are Black, 2020, pp. 1-14 [online], [retrieved Jul. 18, 2024], retrieved from the Internet <URL: https://web.archive.org/web/20201029101520/https://www.photodoto.com/camera-color-guide-why-cameras-are-black/>. (Year: 2020).*

Atlas Tech Note No. 11, 2010, pp. 1-4 [online], [retrieved Jul. 20, 2024], retrieved from the Internet <URL: https://www.atlassteels.com.au/documents/TN11-Magnetic_response_rev_July_2020.pdf>. (Year: 2010).*

Bryan Rosenberger, The Three Types of Fit, 2020, pp. 1-2 [online], [retrieved Jan. 8, 2024], retrieved from the Internet <URL: https://randrmanufacturing.com/blog/the-three-types-of-fit/>. (Year: 2020).*

* cited by examiner

OPTICAL ELEMENT DRIVE MECHANISM

CROSS REFERENCE TO RELATED APPLICATIONS

This application claims the benefit of U.S. Provisional Application No. 63/127,746, filed Dec. 18, 2020, and U.S. Provisional Application No. 63/143,344, filed Jan. 29, 2021, the entirety of which is incorporated by reference herein.

BACKGROUND OF THE INVENTION

Field of the Invention

The present invention relates to a drive mechanism, and, in particular, to an optical element drive mechanism.

Description of the Related Art

As technology has developed, many electronic devices (such as tablet computers and smartphones) may be used for capturing images and recording video. The optical element and the optical element drive mechanism in the electronic device allow the user to use the electronic device to capture images and record video. When the electronic device is being used, shock or vibration may occur, and this may cause the images or video to come out blurry. Therefore, the demand for higher quality images and video is increasing.

BRIEF SUMMARY OF THE INVENTION

An optical element drive mechanism is provided. The optical element drive mechanism includes an immovable part, a movable part, a drive assembly, and a strengthening assembly. The movable part is connected to an optical element. The movable part is movable relative to the immovable part. The drive assembly drives the movable part to move relative to the immovable part. The strengthening assembly strengthens the driving force of the drive assembly. The strengthening assembly is close to the drive assembly.

In some embodiments, the immovable part includes a case and a bottom. The case includes a top wall with a plate structure and a side wall with a plate structure. the top wall is perpendicular to a main axis. The bottom is immovably connected to the case. An accommodation space is formed between the case and the bottom to accommodate the movable part. The case further includes a first protrusion protruding from the top wall toward the accommodation space. The thickness of the first protrusion is greater than the thickness of the top wall. The drive assembly is disposed on the first protrusion. In some embodiments, the strengthening assembly includes a side plate with a plate structure and parallel with the side wall of the case, and the side plate is located between the drive assembly and the side wall. The thickness of the side wall is identical to the thickness of the side plate. The side wall and the side plate include a metal material. The magnetic permeability of the side wall is less than the magnetic permeability of the side plate. The drive assembly includes a magnetic element disposed on the side wall.

In some embodiments, the strengthening assembly further includes a top plate with a plate structure and parallel with the top wall of the case, and the top plate is located between the drive assembly and the top wall. The thickness of the top wall is identical to the thickness of the top plate. The thickness of the top plate is identical to the thickness of the side plate. The thickness of the top plate is between 0.15 mm to 0.60 mm. The top wall and the top plate include a metal material. The magnetic permeability of the top wall is less than the magnetic permeability of the top plate. The top plate is spaced apart from the magnetic element by a gap. The minimum distance between the top plate and the magnetic element is different from the minimum distance between the side plate and the magnetic element. The top plate is spaced apart from the top wall by a gap. The minimum distance between the top plate and the top wall is different from the minimum distance between the side plate and the side wall.

In some embodiments, the minimum distance between the top plate and the magnetic element is greater than the minimum distance between the side plate and the magnetic element, and the minimum distance between the top plate and the top wall is greater than the minimum distance between the side plate and the side wall. In some embodiments, the case further includes a second protrusion protruding from the top wall toward the accommodation space. The drive assembly is disposed on the second protrusion. The first protrusion and the second protrusion are arranged along a first axis. In the first axis, the minimum distance between the first protrusion and the second protrusion is greater than the maximum size of the top plate. When viewed along the main axis, the top plate is spaced apart from the first protrusion by a gap. When viewed along the main axis, the top plate is spaced apart from the second protrusion by a gap.

In some embodiments, the immovable part further includes an embedded assembly, and at least part of the embedded assembly is embedded and not revealed from the bottom. The bottom includes a non-metal material. The embedded assembly includes a metal material, and the embedded assembly and the side wall include different materials. The embedded assembly is electrically connected to the case. The embedded assembly is immovably connected to the side wall via soldering or welding. The embedded assembly includes a connection portion connected to the side wall. The embedded assembly further includes a protruding pin connected to an external circuit. The side wall includes a protruding portion protruding from the side wall.

In some embodiments, the optical element drive mechanism further includes a circuit assembly and a sensing assembly. The circuit assembly is electrically connected to the drive assembly, and the sensing assembly senses movement of the movable part relative to the immovable part. The circuit assembly has a plate structure and is perpendicular to the main axis. The circuit assembly and the bottom are separate elements. The circuit assembly includes a first pin and a second pin electrically connected to the external circuit. The minimum distance between the protruding pin and the first pin is different from the minimum distance between the first pin and the second pin. The minimum distance between the protruding pin and the first pin is greater than the minimum distance between the first pin and the second pin. The sensing assembly includes a sensing element disposed on the circuit assembly. The bottom includes an opening structure receiving the circuit assembly, and the opening structure is a closed structure.

In some embodiments, the optical element drive mechanism further includes a first elastic element and a second elastic element. The movable part is movably connected to the immovable part via the first elastic element and the second elastic element. The first elastic element has a plate structure and is perpendicular to the main axis. The first elastic element is connected to the bottom. The first elastic element has a metal material. The magnetic permeability of the first elastic element is less than the magnetic permeability of the side plate. The second elastic element has a plate structure and is perpendicular to the main axis. The second elastic element is connected to the bottom. The first elastic element is parallel with the second elastic element. The first elastic element is electrically connected to an external module. The first elastic element includes an electrical contact electrically connected to the external module. When viewed along the main axis, the electrical contact is revealed from the top wall. The second elastic element is electrically connected to the drive assembly. The embedded assembly further includes a first circuit and a second circuit. At least part of the first circuit and the second circuit is embedded and not revealed from the bottom. The first elastic element is electrically connected to the circuit assembly via the first circuit. The second elastic element is electrically connected to the circuit assembly via the second circuit.

In some embodiments, the side wall includes a non-metal material. The strengthening assembly includes a metal material. The strengthening assembly is disposed in the side wall. The strengthening assembly includes a plurality of strengthening elements. The strengthening elements are embedded in the side wall. The strengthening elements have particle structures. The maximum size of each of the strengthening elements is less than 0.05 mm. The ratio of the total volume of the strengthening elements to the volume of the side wall is between 5% and 40%. The side wall is dark-colored. The thickness of the top wall is different from the thickness of the side wall. The thickness of the top wall is less than the thickness of the side wall. The thickness of the top wall is between 0.10 mm and 0.55 mm. The thickness of the side wall is between 0.15 mm and 0.60 mm.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" and/or "above" a second feature in the description that follows may include embodiments in which the first and second features are formed in direct contact, and may also include embodiments in which additional features may be formed between the first and second features, so that the first and second features may not be in direct contact. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly. In addition, in different examples of this disclosure, symbols or alphabets may be used repeatedly.

Ordinal terms such as "first", "second", etc., used in the description and in claims do not by themselves connote any priority, precedence, or order of one element over another, but are used merely as labels to distinguish one element from another element having the same name. Unless the context requires otherwise, throughout the specification and claims that follow, the word "include", "have" and variations thereof, such as "includes", "including", "having" are to be construed in an open, inclusive sense, that is, as "including, but not limited to."

Figure 1:
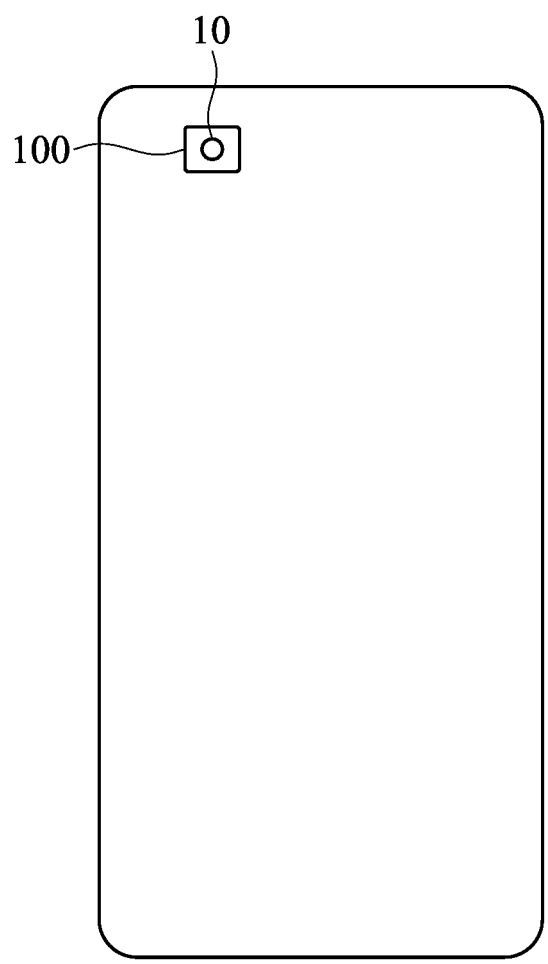
FIG. 1 is a schematic view of the electronic device, the optical element, and the optical element drive mechanism.
Figure 2:
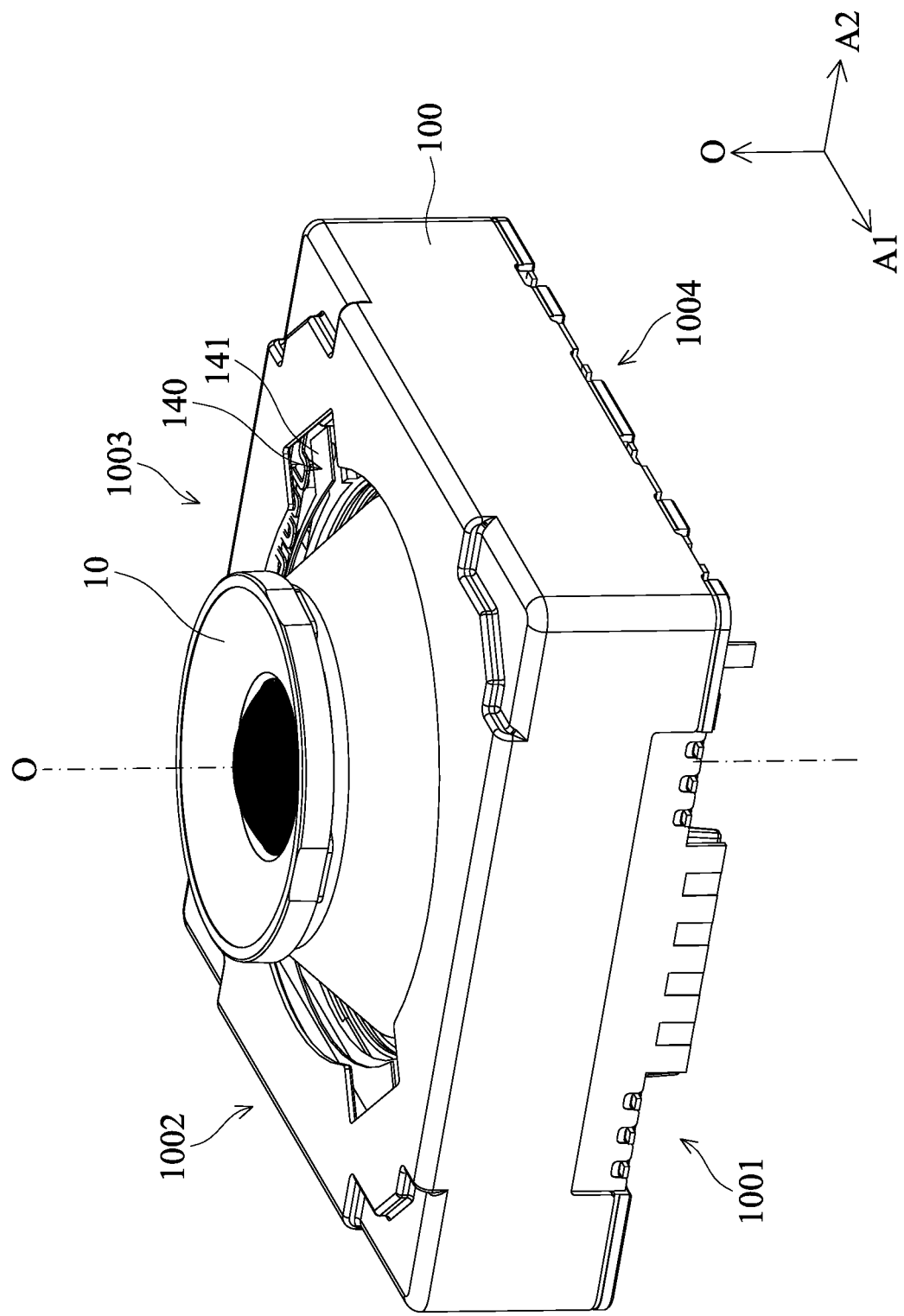
FIG. 2 is a schematic view of the optical element and the optical element drive mechanism.

Please refer to FIG. 1 and FIG. 2. FIG. 1 is a schematic view of an electronic device 1, an optical element 10, and an optical element drive mechanism 100. FIG. 2 is a schematic view of the optical element 10 and the optical element drive mechanism 100. The electronic device 1 may be a tablet computer, a smart phone, etc. The optical element 10 may be a lens. The optical element 10 may be made of plastic or glass. The optical element 10 may be circular or it may have another shape. The optical element 10 and the optical element drive mechanism 100 may be disposed in the electronic device 1, so that a user may capture images and record video. The optical element drive mechanism 100 may hold the optical element 10 and drive the optical element 10 to move, so as to adjust the position of the optical element 10 to capture clear images. The optical element drive mechanism 100 is typically placed in the top region of the electronic device 1 to increase the display area of the electronic device 1, but it is not limited thereto.

The optical element 10 has an optical axis O. The optical axis O is an imaginary axis passing through the center of the optical element 10. The optical element drive mechanism 100 has a main axis MA (denoted in FIG. 3). The main axis MA is an imaginary axis passing through the center of the optical element drive mechanism 100. When the optical element 10 and the optical element drive mechanism 100 are aligned, the optical axis O substantially overlaps the main axis MA. Therefore, in the followings and in the drawings, the optical axis O of the optical element 10 and/or the main axis MA of the optical element drive mechanism 100 may be used to illustrate or describe the related features of the optical element drive mechanism 100. It should be noted that, since the optical element 10 is movably placed in the optical element drive mechanism 100, the optical axis O of the optical element 10 may be not exactly overlap the main axis MA of the optical element drive mechanism 100 because of the movement, shake, rotation, tilt, and the like, of the optical element drive mechanism 100.

When viewed along the optical axis O, the optical element drive mechanism 100 is polygonal, such as quadrilateral. For ease of illustration, the four sides of the optical element drive mechanism 100 are referred to as a first side 1001, a second side 1002, a third side 1003, and a fourth side 1004. The first side 1001 is opposite the third side 1003, and the second side 1002 is opposite the fourth side 1004. The first side 1001 is substantially parallel with the third side 1003, and the second side 1002 is substantially parallel with the fourth side 1004. The first side 1001, the second side 1002, the third side 1003, and the fourth side 1004 are substantially perpendicular to the optical axis O. When viewed along the optical axis O, the second side 1002 and the fourth side 1004 are parallel with a first axis A1, and the second side 1002 and the fourth side 1004 extend along the first axis A1. When viewed along the optical axis O, the first side 1001 and the third side 1003 are parallel with a second axis A2, and the first side 1001 and the third side 1003 extend along the second axis A2. The first axis A1 and the second axis A2 are substantially perpendicular to the optical axis O.

Figure 3:
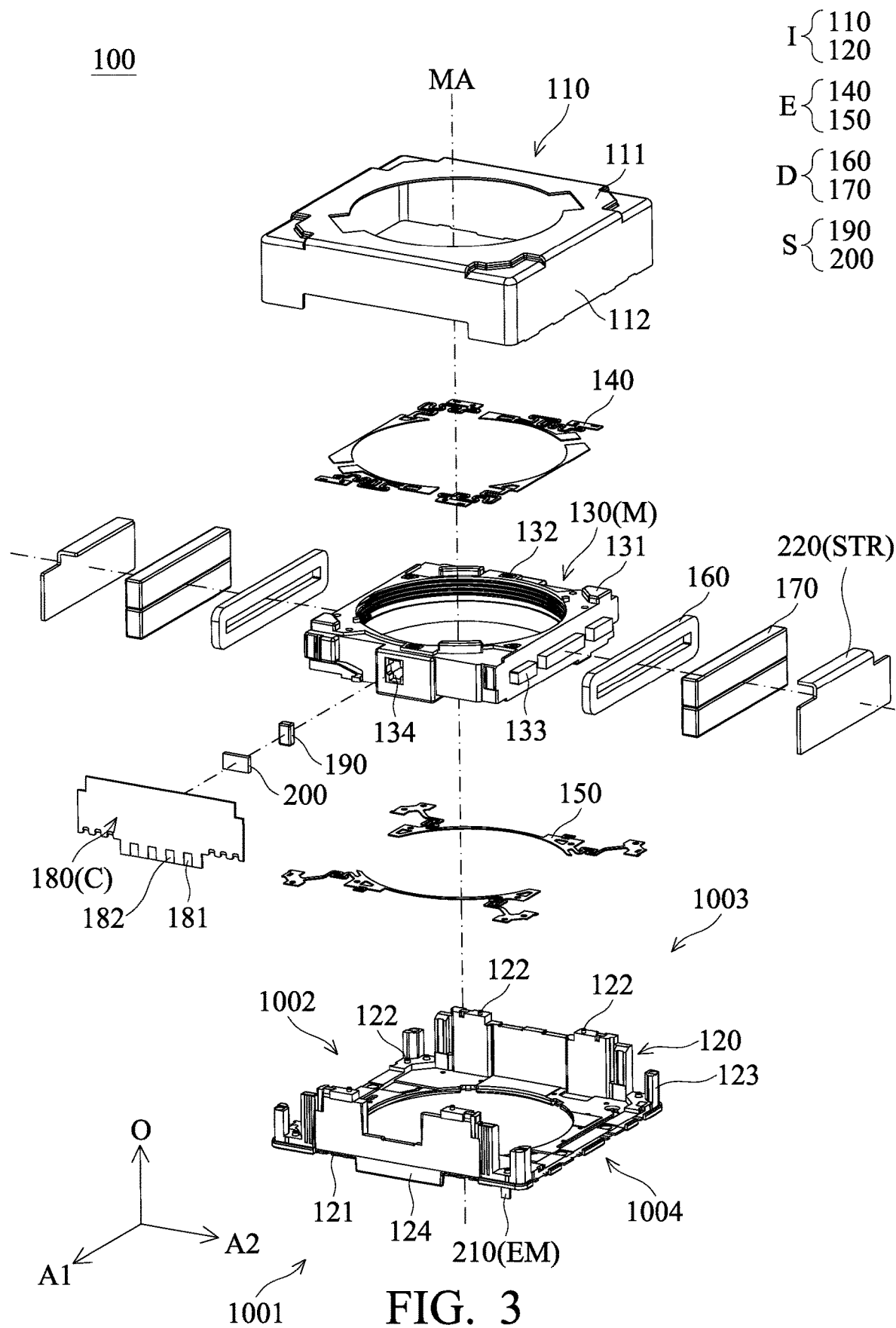
FIG. 3 is an exploded view of the optical element drive mechanism.

Next, please refer to FIG. 2 and FIG. 3. FIG. 3 is an exploded view of the optical element drive mechanism 100 with some elements omitted. The optical element drive mechanism 100 includes an immovable part I, a movable part M, an elastic assembly E, a drive assembly D, a circuit assembly C, a sensing assembly S, an embedded assembly EM, and a strengthening assembly STR. The movable part M may be connected to the optical element 10. The movable part M is movable relative to the immovable part I. The elastic assembly E connects the immovable part I and the movable part M. The drive assembly D may drive the movable part M to move relative to the immovable part I. The circuit assembly C may transmit the current. The sensing assembly S may sense the movement of the movable part M relative to the immovable part I. The strengthening assembly STR may strengthen the driving force of the drive assembly D.

In this embodiment, the immovable part I includes a case 110 and a bottom 120. The movable part M includes a holder 130. The elastic assembly E includes two first elastic elements 140 and two second elastic elements 150. The drive assembly D includes two coils 160 and two magnetic elements 170. The circuit assembly C includes a circuit element 180. The sensing assembly S includes a reference element 190 and a sensing element 200. The embedded assembly EM includes a plurality of embedded elements 210. The strengthening assembly STR includes two strengthening elements 220. It should be noted that elements may be added or removed as needed. Also, for a clear illustration, some elements may be omitted from the drawings.

The case 110 may be immovably connected to the bottom 120, and thus an accommodation space is formed between the case 110 and the bottom 120. The accommodation space may accommodate the movable part M, the elastic assembly E, the circuit assembly C, the sensing assembly S, and the strengthening assembly STR, and the like. The case 110 includes a top wall 111 with a plate structure and a plurality of side walls 112 each with a plate structure. The top wall 111 is substantially perpendicular to the main axis MA. Each of the side walls 112 extends along the main axis MA from the edge of the top wall 111. In some embodiments, the case 110 and/or the bottom 120 include a metal material or a magnetic material. In some embodiments, the case 110 and/or the bottom 120 include a non-metal material such as a plastic material. The material may be determined as needed.

The bottom 120 includes an opening structure 121, a plurality of connection portions 122, a plurality of columns 123, and a support portion 124. The opening structure 121 is located on the first side 1001. The opening structure 121 may accommodate the circuit assembly C. The opening structure 121 is a closed structure. The connection portions 122 may be located on different surfaces of the bottom 120 in the main axis MA. The columns 123 are located at different corners of the bottom 120. The columns 123 may be in contact with the side wall 112 of the case 110 to increase the contact area between the case 110 and the bottom 120, thereby strengthening the connection between the case 110 and the bottom 120 to prevent the case 110 from falling off. The circuit assembly C may in direct contact with the support portion 124 to be supported and fixed by the support portion 124.

The holder 130 may be connected to the optical element 10. In some embodiments, the holder 130 includes a plastic material. The holder 130 includes a plurality of stopper-portions 131, a plurality of connection portions 132, a plurality of electrical connection portions 133, and a recess 134. The stopper-portions 131 and the connection portions 132 are disposed on the top surface of the holder 130. The stopper-portions 131 and the connection portions 132 may be protrusions. The electrical connection portions 133 are located on the second side 1002 and the fourth side 1004. The recess 134 is formed on the side of the holder 130 and located on the first side 1001.

When the drive assembly D drives the holder 130 to move along the optical axis O toward the top wall 111 of the case 110 and to reach the limit, the stopper-portions 131 may be in contact with the top wall 111 of the case 110 first so as to prevent the rest of the portions of the holder 130 from colliding with the case 110. Similar stopper-portions may also be placed on the bottom surface of the bottom surface of the holder 130. Therefore, the stability of the overall optical element drive mechanism 100 is enhanced.

The first elastic element 140 has a plate structure and is perpendicular to the main axis MA. The second elastic element 150 has a plate structure and is perpendicular to the main axis MA. The first elastic element 140 is parallel with the second elastic element 150. In detail, the first elastic element 140 is disposed between the top wall 111 of the case 110 and the holder 130. The second elastic element 150 is disposed between the holder 130 and the bottom 120. The first elastic element 140 and the second elastic element 150 are made of an elastic material or a ductile material, e.g., metal. In this technical field, the first elastic element 140 and the second elastic element 150 may be known as "spring", "leaf spring", "plate spring", etc.

The first elastic element 140 connects the bottom 120 and the holder 130. In other words, the movable part M is movably connected to the immovable part I via the first elastic element 140 and the second elastic element 150. For example, the first elastic element 140 may be disposed on the connection portions 122 of the bottom 120 and the connection portions 132 of the holder 130. When the movable part M moves relative to the immovable part I, the range of motion of the holder 130 may be restricted by the first elastic element 140 and the second elastic element 150. Therefore, the holder 130 and the optical element 10 therein do not get damaged because of collision of the holder 130 with the case 110 or the bottom 120 when the optical element drive mechanism 100 moves or is impacted.

Furthermore, the first elastic element 140 may be used for electrical connection to an external module (not shown). For example, the external module that the first elastic element 140 is electrically connected to may be an aperture, another optical element drive mechanism, etc. The first elastic element 140 includes an electrical contact 141 (denoted in FIG. 2) for electrical connection to the external module. When viewed along the main axis MA, the electrical contact 141 is revealed from the top wall 111 of the case 110. Also, the second elastic element 150 may be used for electrical connection to the drive assembly D.

The two coils 160 are disposed on the second side 1002 and the fourth side 1004, respectively. The coils 160 are polygonal and surround the electrical connection portions 133 of the holder 130. The two magnetic elements 170 are disposed on the second side 1002 and the fourth side 1004, respectively, and the magnetic elements 170 correspond to the coils 160. The magnetic elements 170 are disposed on the inner side of the side walls 112 of the case 110. When the current is supplied to the drive assembly D, the magnetic force that is parallel with the optical axis O is generated between the coils 160 and the magnetic elements 170. The magnetic force may drive the holder 130 and the optical element 10 therein to move relative to the immovable part I along the optical axis O to make an object to be in focus, thereby achieving auto focus (AF).

The circuit assembly C is electrically connected to the drive assembly D. The circuit element 180 is disposed on the first side 1001. The circuit element 180 has a plate structure and is parallel with the main axis MA. The circuit element 180 and the bottom 120 are separate elements. The circuit element 180 may be a circuit board such as a flexible printed circuit (FPC), a rigid-flexible board, etc. The circuit element 180 includes a plurality of pins used for electrical connection to an external circuit (not shown) outside the optical element drive mechanism 100, and the pins include a first pin 181 and a second pin 182. The first pin 181 is adjacent to the second pin 182.

The reference element 190 is disposed on the recess 134. The sensing element 200 corresponds to the reference element 190, and the sensing element 200 is disposed on the circuit element 180. The reference element 190 may be a magnetic element. The sensing element 200 may be a Hall sensing element, a giant magnetoresistive (GMR) sensing element, a tunneling magnetoresistive (TMR) sensing element, etc. The sensing element 200 may sense the reference element 190 to find out the position of the movable part M. In particular, the sensing element 200 may sense the change of the lines of magnetic field (including but not limited to the density of the lines of magnetic field and the direction of the lines of magnetic field) of the reference element 190 to find out the position of the holder 130.

Figure 4:
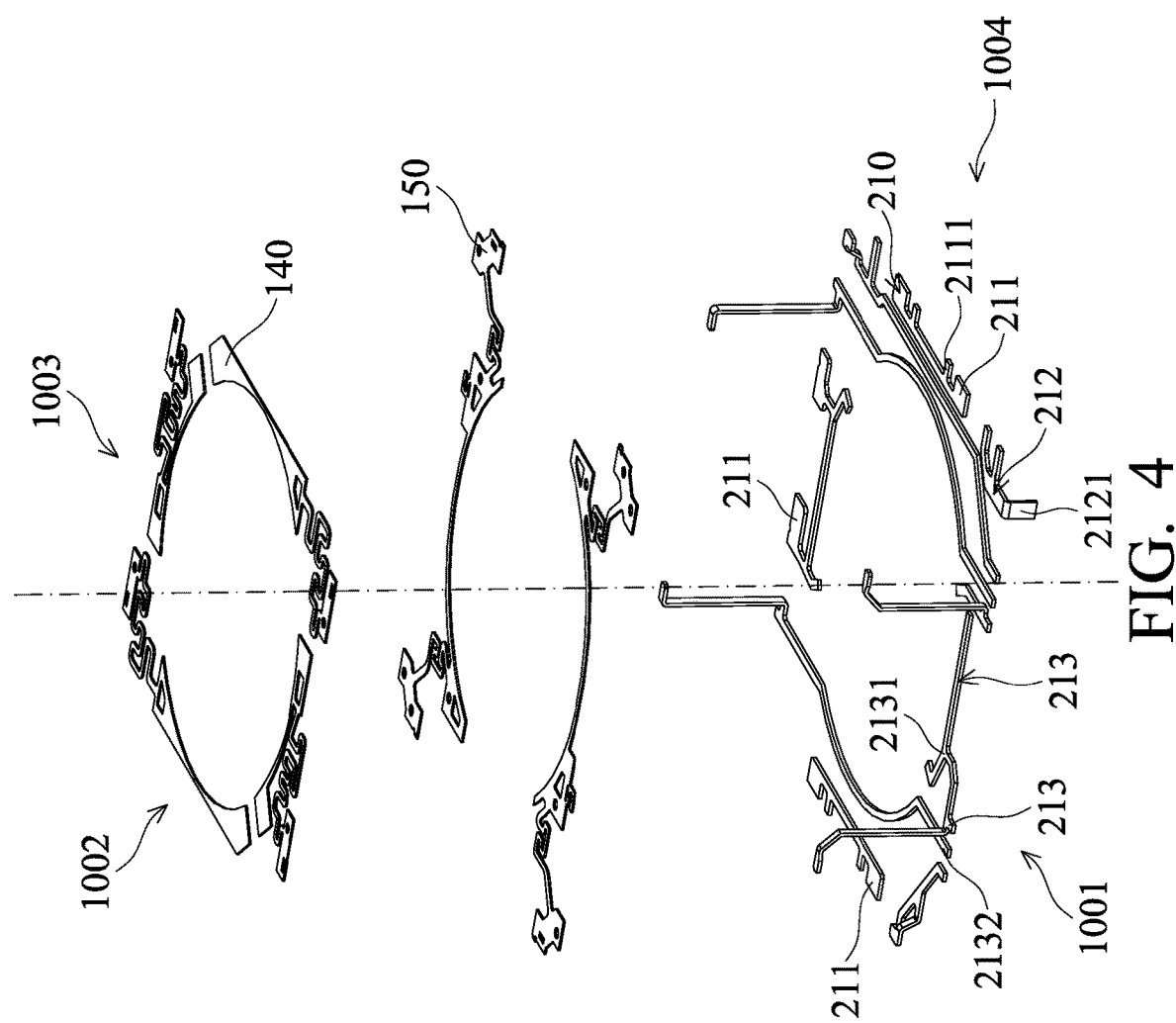
FIG. 4 is a perspective view of the elastic assembly and the embedded assembly.
Figure 5:
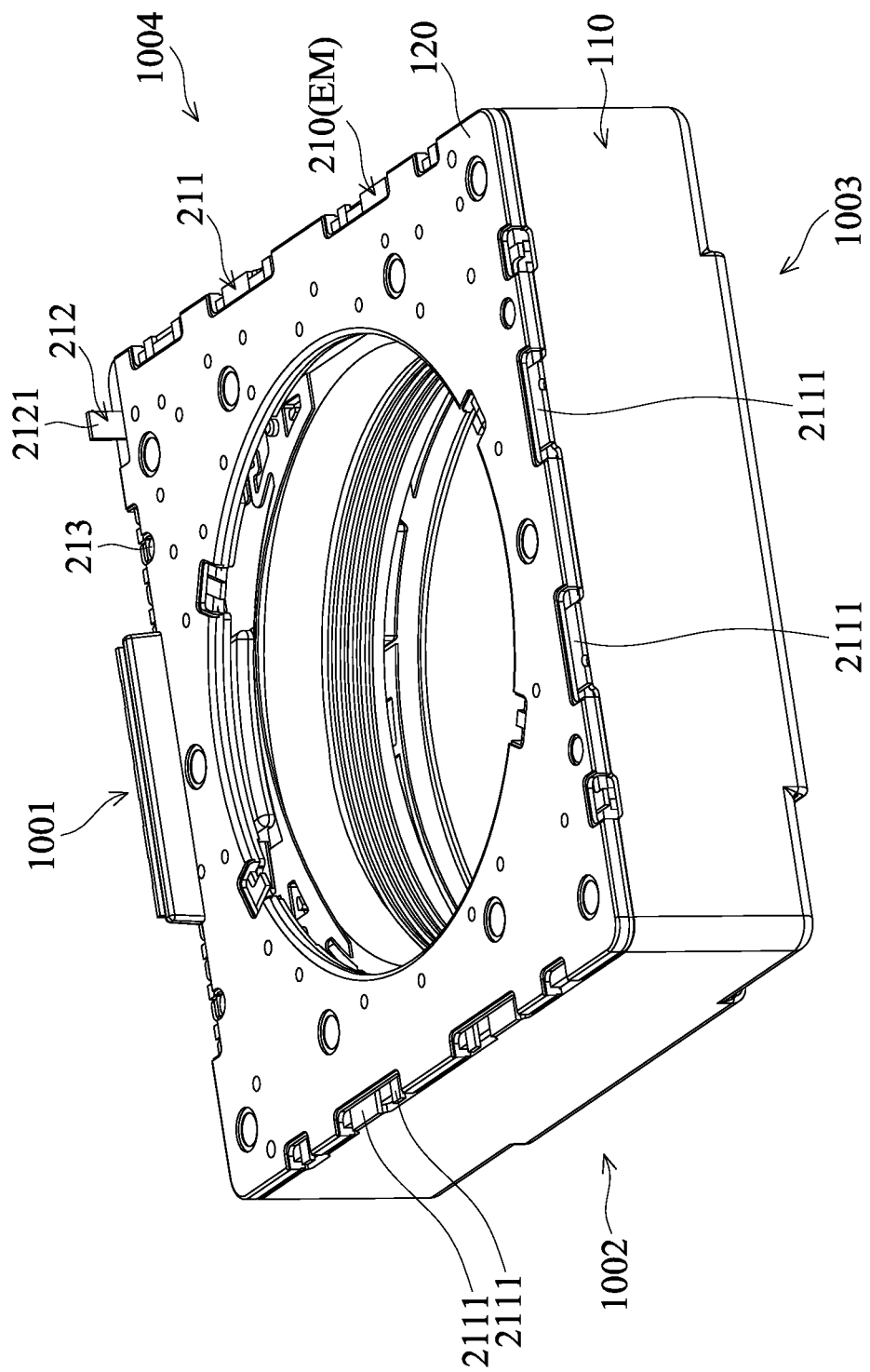
FIG. 5 is a perspective view of the optical element drive mechanism.
Figure 6:
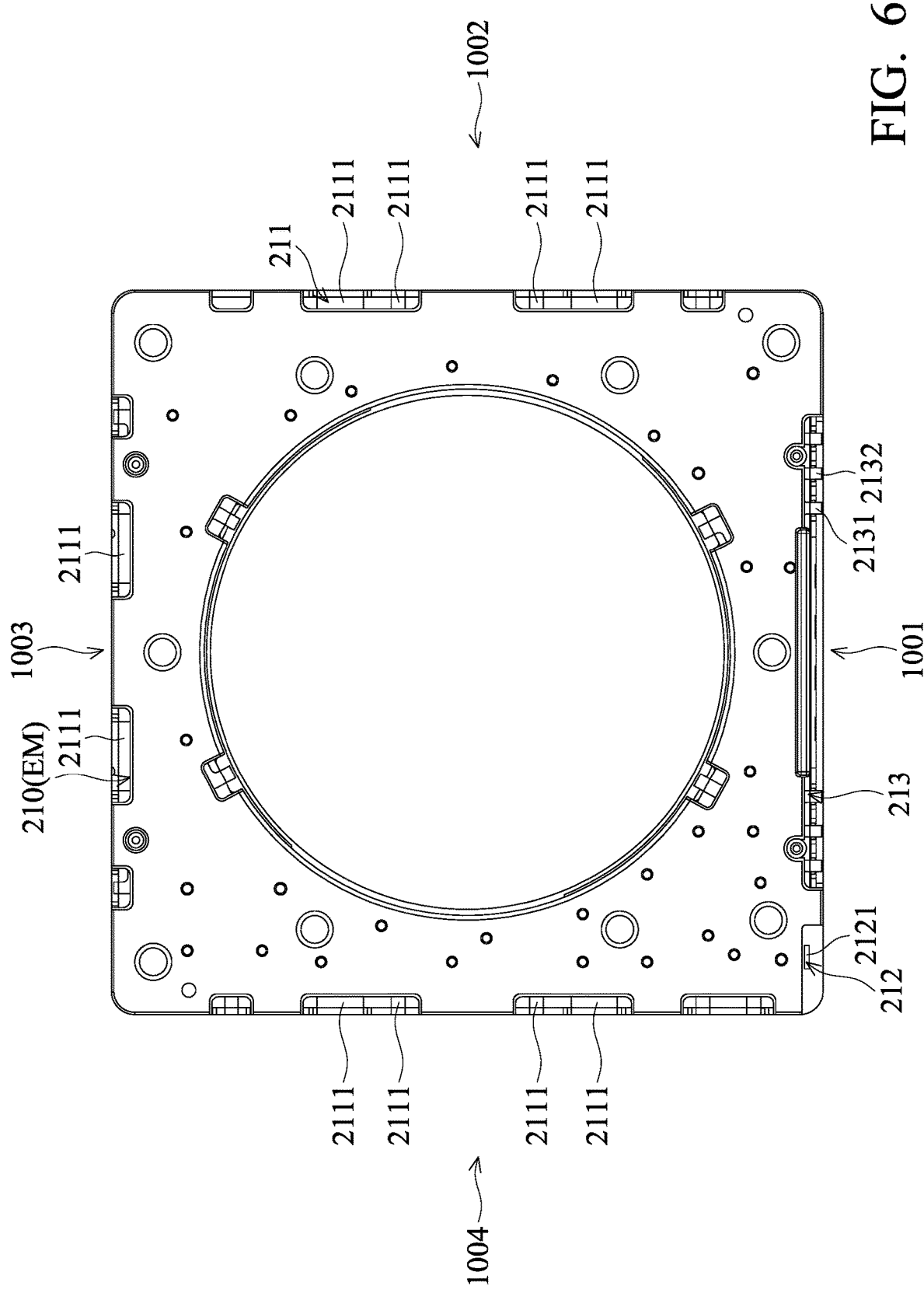
FIG. 6 is a bottom view of the optical element drive mechanism.

Next, in addition to FIG. 2 and FIG. 3, please also refer to FIG. 4 to FIG. 6 to know the embedded assembly EM. FIG. 4 is a perspective view of the elastic assembly E and the embedded assembly EM. FIG. 5 is a perspective view of the optical element drive mechanism 100. FIG. 6 is a bottom view of the optical element drive mechanism 100. In some embodiments, the embedded assembly EM includes a metal material, and the embedded assembly EM and the side walls 112 of the case 110 include different materials. In some embodiments, the embedded assembly EM may be circuits. The embedded assembly EM may be formed in the bottom 120 by methods such as insert molding. That is, the embedded assembly EM and the bottom 120 may be formed integrally as one piece, and at least part of the embedded assembly EM is embedded and not revealed from the bottom 120. The magnetic attraction force may be generated between the embedded assembly EM and the drive assembly D. Also, the external force exerted on the bottom 120 may be distributed by the embedded assembly EM. Therefore, in addition to the electrical connection, the embedded assembly EM may also increase the strength of the bottom 120 and the overall strength of the optical element drive mechanism 100.

The embedded assembly EM may include a first embedded portion 211, a second embedded portion 212, and a third embedded portion 213 that are electrically connected to different elements. For example, the first embedded portion 211 is electrically connected to the case 110, the second embedded portion 212 is electrically connected to an external circuit (not shown), and the third embedded portion 213 is electrically connected to the circuit assembly C. To avoid shortcut, the first embedded portion 211, the second embedded portion 212, and the third embedded portion 213 are independent. The first embedded portion 211, the second embedded portion 212, and the third embedded portion 213 may have different shapes.

The first embedded portion 211 may include a plurality of connection portions 2111 connected to the side walls 112 of the case 110. The connection portions 2111 are disposed on the second side 1002, the third side 1003, and the fourth side 1004. To strengthen the connection between the side walls 112 and the connection portions 2111, the side walls 112 may include a plurality of protruding portions 1121 protruding from the side walls 112 (denoted in FIG. 7). The protruding portions 1121 may immovably connected to the side walls 112 of the case 110 via soldering, welding, etc.

The second embedded portion 212 may include a protruding pin 2121. The protruding pin 2121 may be a ground pin. The protruding pin 2121 protrudes from the bottom surface of the bottom 120. In some embodiments, the protruding pin 2121 is located on the corner of the bottom 120. The protruding pin 2121 and the first pin 181 and the second pin 182 of the circuit element 180 may be connected to the same or different external circuits. The minimum distance between the protruding pin 2121 and the first pin 181 is different from the minimum distance between the first pin 181 and the second pin 182. In some embodiments, the minimum distance between the protruding pin 2121 and the first pin 181 is greater than the minimum distance between the first pin 181 and the second pin 182. In the present disclosure, the protruding pin 2121 is disposed on the bottom 120, not the case 110 to simplify the manufacturing process and save the cost. For example, the electroplating process of the case 110 may be omitted or simplified.

The third embedded portion 213 includes a first circuit 2131 and a second circuit 2132. At least part of the first circuit 2131 and the second circuit 2132 are embedded and not revealed from the bottom 120. The first elastic element 140 may be electrically connected to the circuit assembly C via the first circuit 2131. The second elastic element 150 may be electrically connected to the circuit assembly C via the second circuit 2132.

Figure 7:
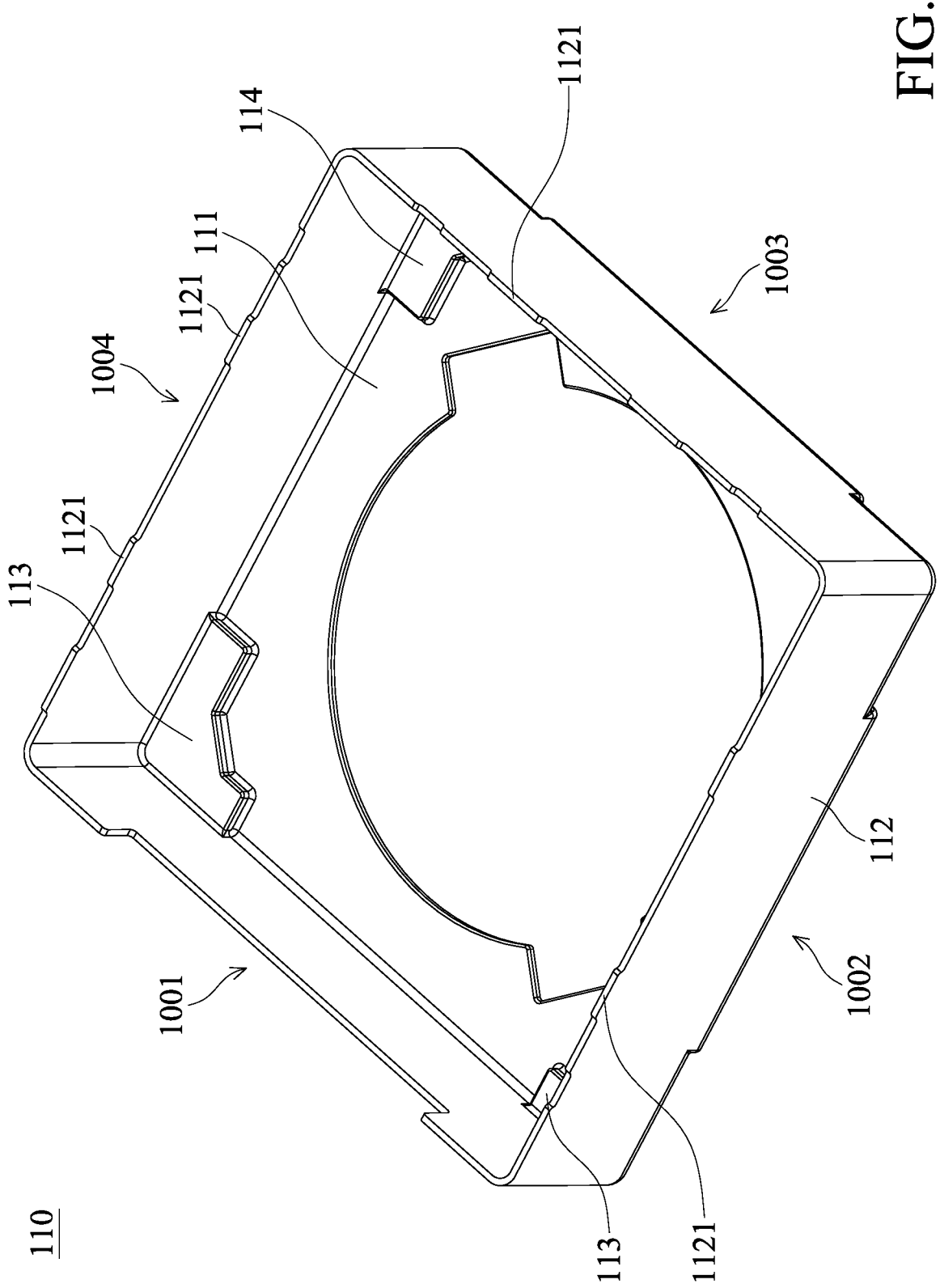
FIG. 7 is a perspective view of the case.
Figure 8:
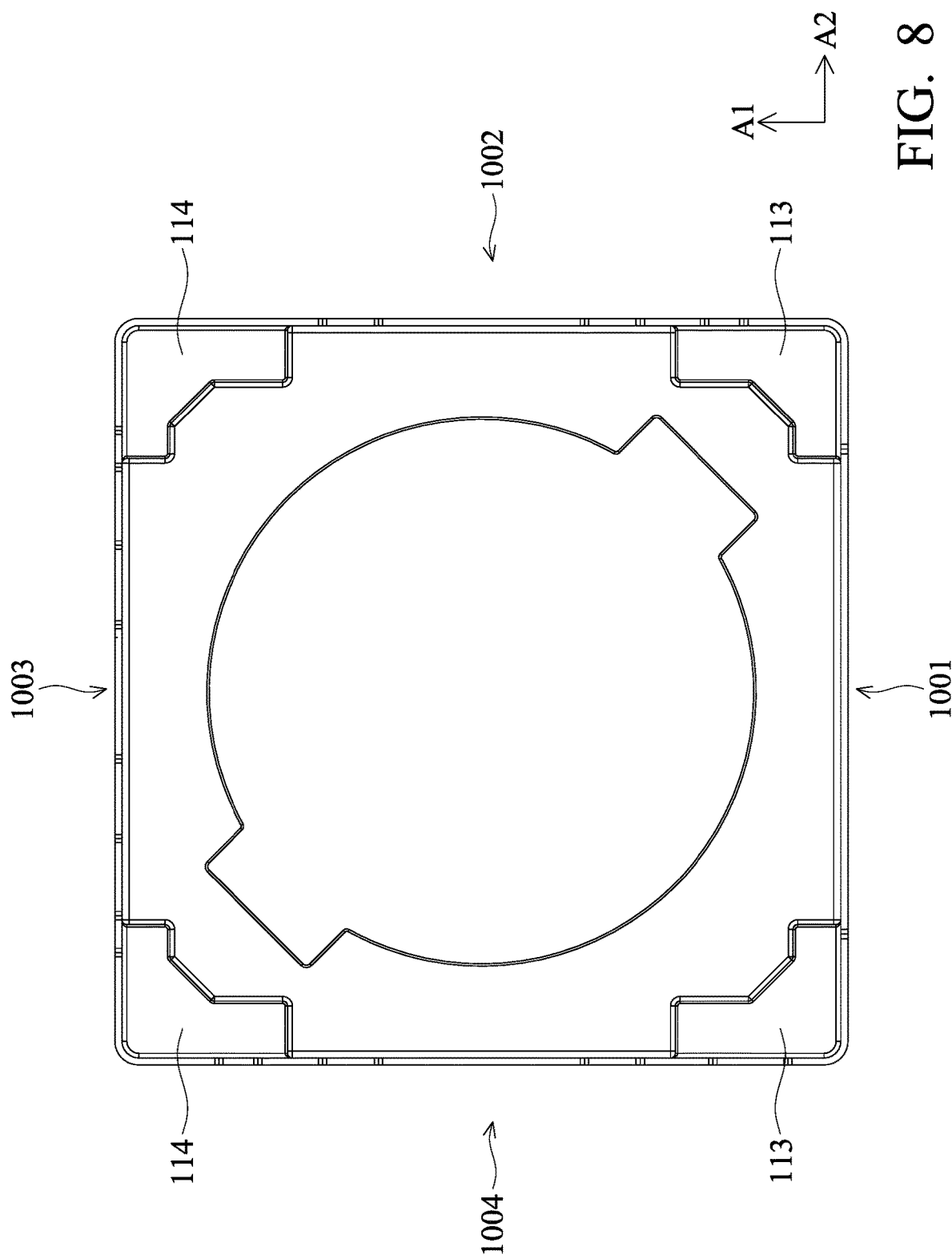
FIG. 8 is a bottom view of the case.
Figure 9:
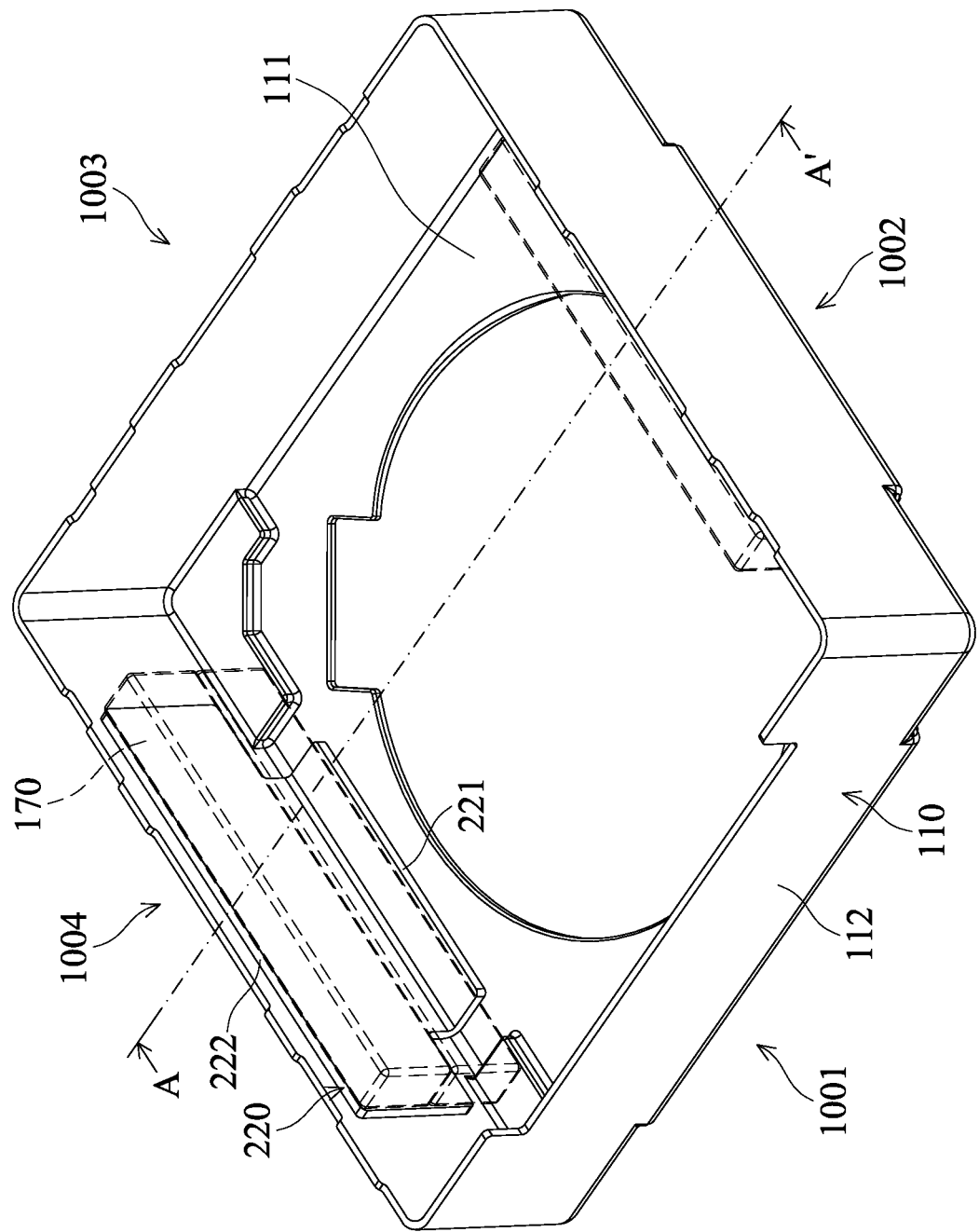
FIG. 9 is a perspective view of the case, the strengthening assembly, and the magnetic element.
Figure 10:
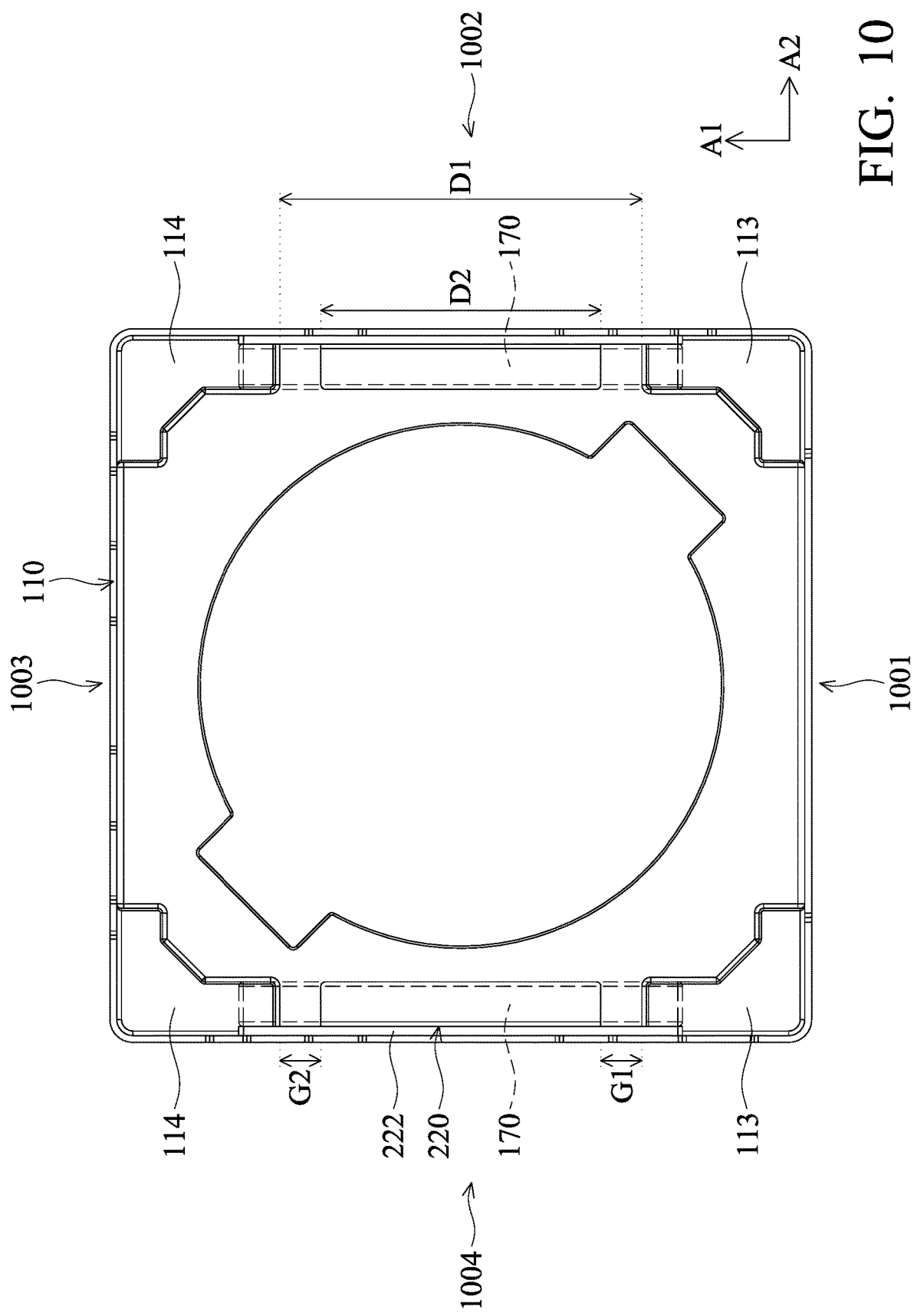
FIG. 10 is a bottom view of the case, the strengthening assembly, and the magnetic element.
Figure 11:
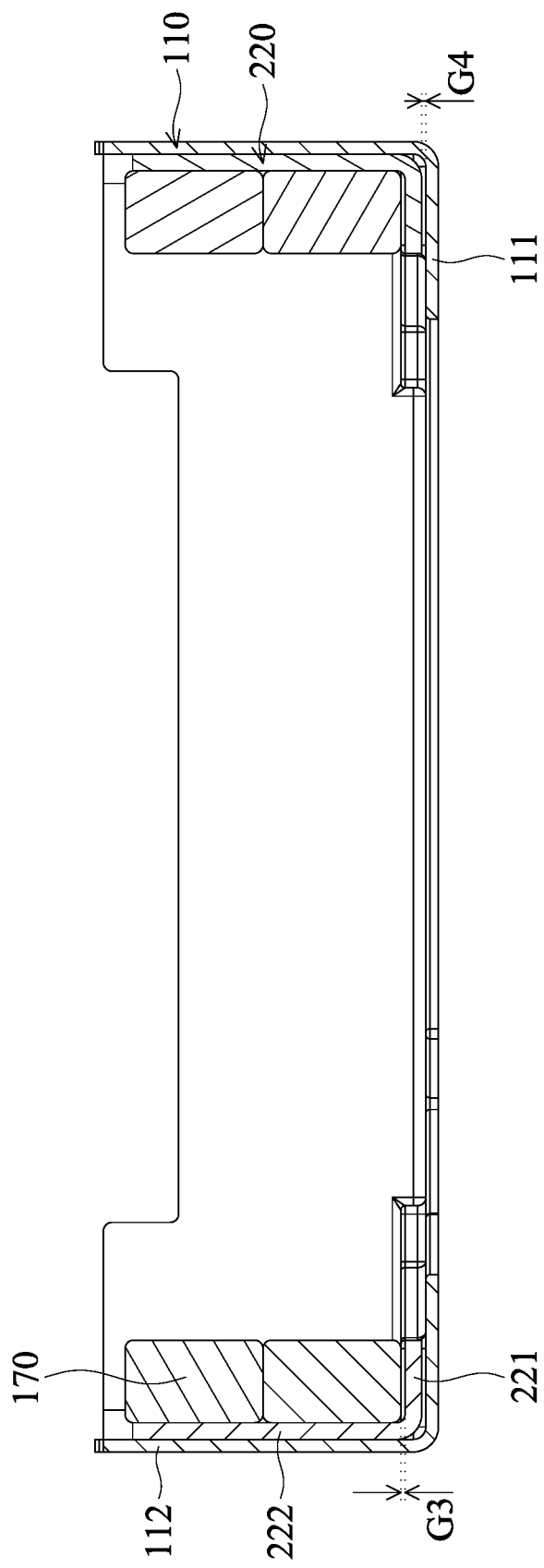
FIG. 11 is a cross-section view taken along the line A-A' in FIG. 9.

Next, in addition to FIG. 2 and FIG. 3, please also refer to FIG. 7 to FIG. 11 to know the strengthening assembly STR. FIG. 7 is a perspective view of the case 110. FIG. 8 is a bottom view of the case 110. FIG. 9 is a perspective view of the case 110, the strengthening assembly STR, and the magnetic elements 170. FIG. 10 is a bottom view of the case 110, the strengthening assembly STR, and the magnetic elements 170. FIG. 11 is a cross-section view taken along the line A-A' in FIG. 9. In FIG. 9 and FIG. 10, the magnetic elements 170 are shown as dashed lines.

The case 110 may further include two first protrusions 113 and two second protrusions 114. The first protrusions 113 and the second protrusions 114 may have substantially the same structure. The first protrusions 113 are disposed on the first side 1001. The second protrusions 114 are disposed on the third side 1003. The first protrusions 113 and the second protrusions 114 are arranged along the first axis A1. The first protrusions 113 protrude toward the accommodation space formed between the case 110 and the bottom 120 from the top wall 111 of the case 110. Therefore, the thickness of each of the first protrusions 113 is greater than the thickness of the top wall 111. Similarly, the second protrusions 114 protrude toward the accommodation space formed between the case 110 and the bottom 120 from the top wall 111 of the case 110. Therefore, the thickness of each of the second protrusions 114 is greater than the thickness of the top wall 111. The magnetic elements 170 are disposed on the first protrusions 113 and the second protrusions 114.

The strengthening elements 220 are disposed between the case 110 and the magnetic elements 170. Each strengthening element 220 includes a top plate 221 and a side plate 222. The top plate 221 includes a plate structure that is perpendicular to the optical axis O, and the top plate 221 is located between the top wall 111 of the case 110 and the top surfaces of the magnetic elements 170. The side plate 222 includes a plate structure that is parallel with the optical axis O, and the side plate 222 is located between the side walls 112 of the case 110 and the side surfaces of the magnetic elements 170. The side plate 222 is substantially parallel with the side walls 112.

In some embodiments, in the first axis A1, the minimum distance D1 between the first protrusions 113 and the second protrusions 114 is greater than the maximum size D2 of the top plate 221. In some embodiments, when viewed along the main axis MA, the top plate 221 is not in direct contact with the first protrusions 113, so that the top plate 221 is spaced apart from the first protrusions 113 by a gap G1. In some embodiments, when viewed along the main axis MA, the top plate 221 is not in direct contact with the second protrusions 114, so that the top plate 221 is spaced apart from the second protrusions 114 by a gap G2.

In some embodiments, the minimum distance between the top plate 221 and the magnetic elements 170 is different from the minimum distance between the side plate 222 and the magnetic elements 170. In some embodiments, the minimum distance between the top plate 221 and the magnetic elements 170 is greater than the minimum distance between the side plate 222 and the magnetic elements 170. For example, in some embodiments, the top plate 221 is not in direct contact with the magnetic elements 170, so that the top plate 221 is spaced apart from the magnetic elements 170 by a gap G3 (only denoted in FIG. 11), and the side plate 222 is in direct contact with the magnetic elements 170.

In some embodiments, the minimum distance between the top plate 221 and the top wall 111 is different from the minimum distance between the side plate 222 and the side walls 112. In some embodiments, the minimum distance between the top plate 221 and the top wall 111 is greater than the minimum distance between the side plate 222 and the side walls 112. For example, in some embodiments, the top plate 221 is not in direct contact with the top wall 111, so that the top plate 221 is spaced apart from the top wall 111 by a gap G4 (only denoted in FIG. 11), and the side plate 222 is in direct contact with the side walls 112. The side plate 222 may be fixed to the side walls 112 by adhesion, welding, etc.

In some embodiments, the thickness of the top plate 221 is identical to the thickness of the side plate 222. Therefore, after the strengthening elements 220 with uniform thickness are formed, the strengthening elements 220 may be folded to distinguish the top plate 221 and the side plate 222. In some embodiments, the thickness of the top plate 221 is identical to the thickness of the top wall 111. In some embodiments, the thickness of the side plate 22 is identical to the thickness of the side walls 112. In some embodiments, the thicknesses of the top wall 111, the side walls 112, the top plate 221, and the side plate 222 are all between 0.15 mm to 0.60 mm.

In some embodiments, the top wall 111, the side walls 112, the top plate 221, and the side plate 222 include metal materials. In some embodiments, the magnetic permeability of the case 110 is less than the magnetic permeability of the strengthening elements 220. In some embodiments, the magnetic permeability of the top wall 111 is less than the magnetic permeability of the top plate 221. In some embodiments, the magnetic permeability of the side walls 112 is less than the magnetic permeability of the side plate 222. In some embodiments, the magnetic permeability of the first elastic element 140 is less than the magnetic permeability of the side plate 222.

The magnetic attraction force may be generated between the strengthening elements 220 and the drive assembly D, which facilitates the connection and fixation of the drive assembly D, and thus the driving force of the drive assembly D is strengthened. Also, since the magnetic permeability of the strengthening elements 220 is greater than those of the case 110 and the first elastic element 140, the strengthening elements 220 may reduce the magnetic interference outside the optical element drive mechanism 100. The strengthening elements 220 may also concentrate the driving force generated by the drive assembly D, thereby further strengthening the driving force of the drive assembly D. In addition, each strengthening element 220 with a plate structure may cover at least part of each magnetic element 170 to protect the magnetic element 170.

Figure 12:
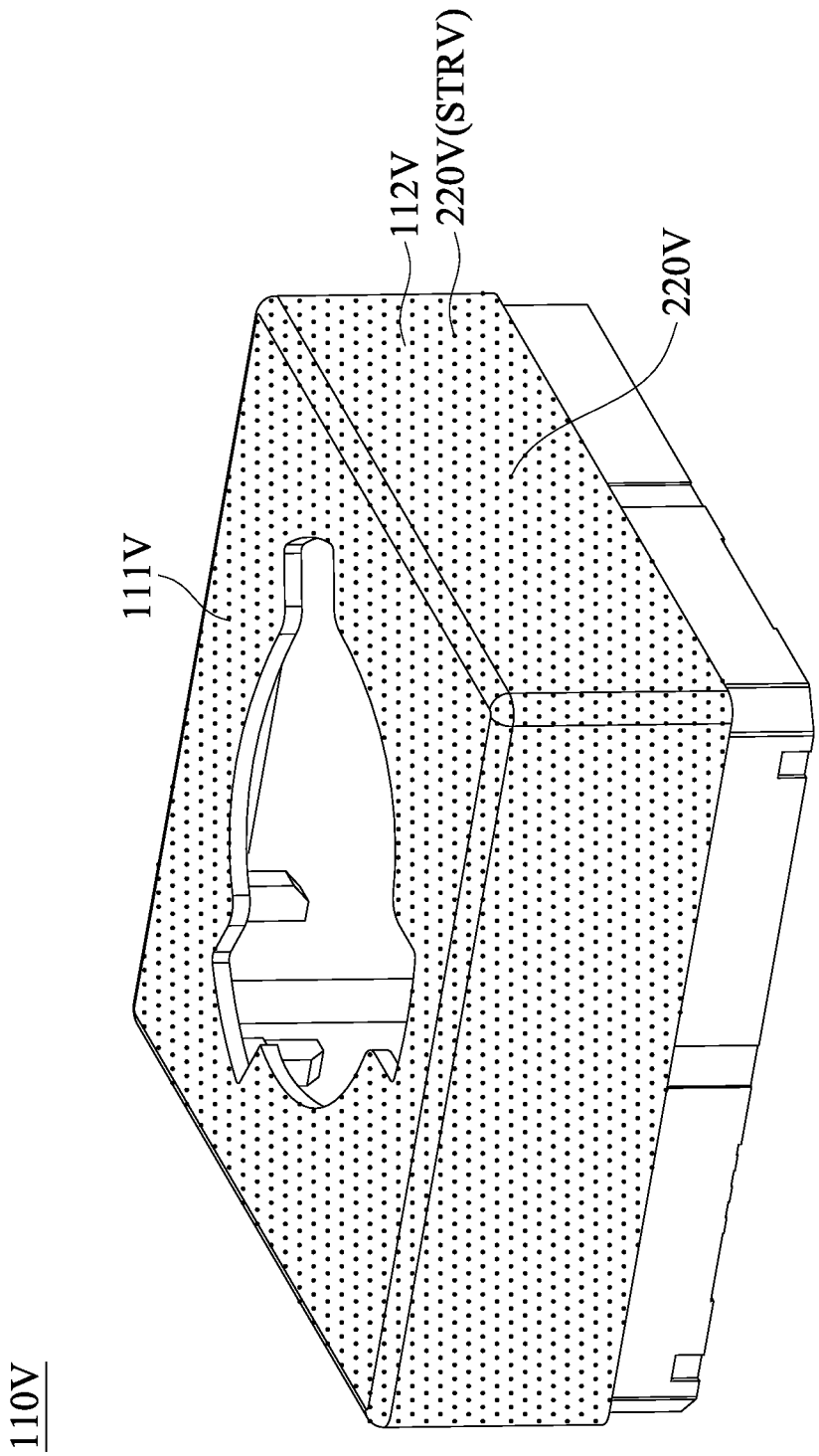
FIG. 12 and FIG. 13 are perspective views of the case and the strengthening assembly according to some other embodiments from different perspectives.
Figure 13:
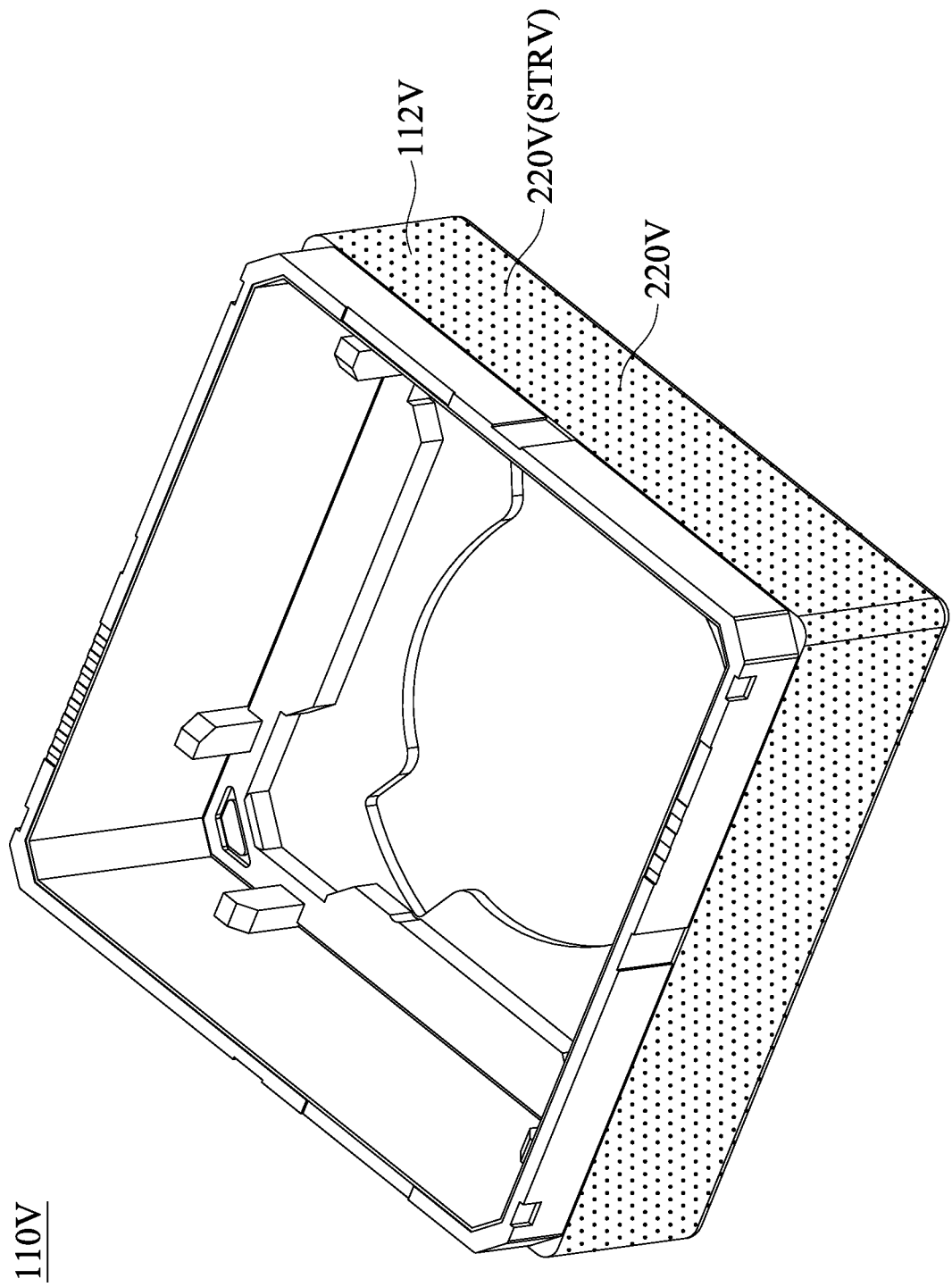

In the followings, identical or similar elements are denoted by identical or similar elements. Next, please refer to FIG. 12 and FIG. 13. FIG. 12 and FIG. 13 are perspective views of a case 110V and a strengthening assembly STRV according to some other embodiments from different perspectives. In FIG. 12 and FIG. 13, the features of the strengthening assembly STRV are different from the features of the strengthening assembly STR. In detail, the strengthening assembly STRV is not a plate structure, and the strengthening assembly STRV is disposed in the case 110V.

In some embodiments, the main material of the case 110V is a metal material or a magnetic material. In some embodiments, the main material of the case 110V is a plastic material. To strengthen the magnetic force between the case 110V and the magnetic elements 170 (especially when the main material of the case 110V is a plastic material), the strengthening assembly STRV may include a metal material. The strengthening assembly STRV includes a plurality of strengthening elements 220V. The strengthening elements 220V may have particle structures, such as metal particles, e.g. iron particles.

The strengthening elements 220V may be embedded in the case 110V, including the top wall 111V and/or the side walls 112V. In some embodiments, the maximum size (e.g. the diameter) of each strengthening element 220V is less than 0.10 mm, for example, less than 0.05 mm, but is not limited thereto. In some embodiments, the ratio of total volume of the strengthening elements 220V to the volume of the case 110V is between 1% and 50%. For example, the ratio of total volume of the strengthening elements 220V in the side walls 112V to the volume of the side walls 112V is between 5% and 40%, such as 20%, but is not limited thereto. Since the magnetic attraction force may be generated between the strengthening elements 220V and the drive assembly D, which facilitates the connection and fixation of the drive assembly D, and thus the driving force of the drive assembly D is strengthened.

In some embodiments, the top wall 111V and the side walls 112V may have different thicknesses. In other words, the thickness of the top wall 111V may be different from the thickness of the side walls 112V. In some embodiments, the thickness of the top wall 111V is less than the thickness of the side walls 112V. In some embodiments, the thickness of the top wall 111V may be between 0.10 mm and 0.55 mm, and the thickness of the side walls 112V may be between 0.15 mm and 0.60 mm. Since the top wall 111V is thinner than the side walls 112V, the range of motion of the optical element 10 along the optical axis O toward the top wall 111V is increased, and the focusing effects are enhanced, thereby enhancing the image quality and the image clearness.

Since the strengthening elements 220V may be dark-colored, the surface of the case 110V may also be dark-colored, such as black, dark blue, dark purple, etc. Therefore, when the light enters the case 110V, the possibilities of generating reflected lights and stray lights are reduced, and thus the user experience is enhanced. It should be noted that, for some traditional techniques, if the case is designed to be dark-colored, then some other process for changing the color of the case is needed. Therefore, due to the strengthening elements 220V, the manufacturing process is simplified and the cost is reduced.

As described above, an optical element drive mechanism including the embedded assembly and the strengthening assembly is provided. At least part of the embedded assembly is embedded in the bottom. The embedded assembly may be electrically connected to other elements, distribute the external force, and generate magnetic attraction force with the drive assembly. Therefore, in addition to the electrical connection, the embedded assembly may also increase the strength of the bottom and the overall strength of the optical element drive mechanism. Also, the magnetic attraction force may be generated between the strengthening assembly and the drive assembly, which facilitates the connection and fixation of the drive assembly D, and thus the driving force of the drive assembly is strengthened. In addition, since the magnetic permeability of the strengthening assembly is relatively large, the strengthening assembly may reduce the magnetic interference outside the optical element drive mechanism 100 and may also concentrate the driving force generated by the drive assembly, thereby further strengthening the driving force of the drive assembly. Furthermore, the strengthening elements with plate structures may protect magnetic elements, and the strengthening elements with particle structures may make the case dark-colored to reduce the possibilities of generating reflected lights and stray lights. It should be noted that, the aforementioned embedded assembly, the strengthening elements with plate structures, and the strengthening elements with particle structures may be used separately or together.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element drive mechanism, comprising:
   an immovable part;
   a movable part connected to an optical element, wherein the movable part is movable relative to the immovable part;
   a drive assembly driving the movable part to move relative to the immovable part; and
   a strengthening assembly strengthening a driving force of the drive assembly,
   wherein the strengthening assembly is in contact with the drive assembly,
   wherein the immovable part comprises;
      a case;
      a bottom immovably connected to the case, wherein an accommodation space is formed between the case and the bottom to accommodate the movable part; and
      an embedded assembly connected to the case, wherein at least part of the embedded assembly is embedded and not revealed from the bottom,
   wherein the case comprises:
      a top wall with a plate structure and perpendicular to a main axis;
      a side wall with a plate structure; and
      a first protrusion protruding from the top wall toward the accommodation space, wherein a thickness of the first protrusion is greater than a thickness of the top wall, and the drive assembly is disposed on the first protrusion,
   wherein the bottom comprises a non-metal material, and the embedded assembly comprises a metal material,
   wherein the embedded assembly and the side wall comprise different materials, and the embedded assembly is immovably connected to the side wall via soldering or welding,
   wherein the embedded assembly comprises a connection portion connected to the side wall, and
   wherein the side wall comprises a protruding portion protruding from the side wall.

2. The optical element drive mechanism as claimed in claim 1, wherein the strengthening assembly comprises a side plate with a plate structure and parallel with the side wall of the case, and the side plate is located between the drive assembly and the side wall, wherein:
   a thickness of the side wall is identical to a thickness of the side plate;
   the side wall and the side plate comprise a metal material;
   a magnetic permeability of the side wall is less than a magnetic permeability of the side plate.

3. The optical element drive mechanism as claimed in claim 2, wherein:
   the strengthening assembly comprises a top plate with a plate structure and parallel with the top wall of the case;
   a thickness of the top plate is identical to the thickness of the side plate;
   the thickness of the top plate is between 0.15 mm to 0.60 mm;
   the top wall and the top plate comprise a metal material; and
   a magnetic permeability of the top wall is less than a magnetic permeability of the top plate.

4. The optical element drive mechanism as claimed in claim 3, wherein the top plate is spaced apart from the top wall by a gap, and a minimum distance between the top plate and the top wall is different from a minimum distance between the side plate and the side wall.

5. The optical element drive mechanism as claimed in claim 4, wherein the minimum distance between the top plate and the top wall is greater than the minimum distance between the side plate and the side wall.

6. The optical element drive mechanism as claimed in claim 3, wherein:
the drive assembly comprises a magnetic element disposed on the side wall;
the top plate is spaced apart from the magnetic element by a gap;
a minimum distance between the top plate and the magnetic element is different from a minimum distance between the side plate and the magnetic element.

7. The optical element drive mechanism as claimed in claim 6, wherein the minimum distance between the top plate and the magnetic element is greater than the minimum distance between the side plate and the magnetic element.

8. The optical element drive mechanism as claimed in claim 2, further comprising a first elastic element and a second elastic element, wherein the movable part is movably connected to the immovable part via the first elastic element and the second elastic element, wherein:
the first elastic element has a plate structure and is perpendicular to the main axis;
the first elastic element is connected to the bottom;
the first elastic element has a metal material;
a magnetic permeability of the first elastic element is less than the magnetic permeability of the side plate;
the second elastic element has a plate structure and is perpendicular to the main axis;
the second elastic element is connected to the bottom;
the first elastic element is parallel with the second elastic element;
the first elastic element is electrically connected to an external module;
the first elastic element comprises an electrical contact electrically connected to the external module;
when viewed along the main axis, the electrical contact is revealed from the top wall;
the second elastic element is electrically connected to the drive assembly.

9. The optical element drive mechanism as claimed in claim 8, further comprising a circuit assembly electrically connected to the drive assembly, wherein:
the embedded assembly further comprises a first circuit and a second circuit;
at least part of the first circuit and the second circuit is embedded and not revealed from the bottom;
the first elastic element is electrically connected to the circuit assembly via the first circuit;
the second elastic element is electrically connected to the circuit assembly via the second circuit.

10. The optical element drive mechanism as claimed in claim 1, wherein the embedded assembly further comprises a protruding pin connected to an external circuit.

11. The optical element drive mechanism as claimed in claim 10, further comprising a circuit assembly and a sensing assembly, wherein the circuit assembly is electrically connected to the drive assembly, and the sensing assembly senses movement of the movable part relative to the immovable part, wherein:
the circuit assembly has a plate structure and is perpendicular to the main axis;
the circuit assembly and the bottom are separate elements;
the circuit assembly comprises a first pin and a second pin electrically connected to the external circuit;
a minimum distance between the protruding pin and the first pin is different from a minimum distance between the first pin and the second pin;
the sensing assembly comprises a sensing element disposed on the circuit assembly;
the bottom comprises an opening structure receiving the circuit assembly, and the opening structure is a closed structure.

12. The optical element drive mechanism as claimed in claim 11, wherein the minimum distance between the protruding pin and the first pin is greater than the minimum distance between the first pin and the second pin.

13. The optical element drive mechanism as claimed in claim 1, wherein the side wall is dark-colored.

14. The optical element drive mechanism as claimed in claim 1, wherein the thickness of the top wall is different from a thickness of the side wall.

15. The optical element drive mechanism as claimed in claim 14, wherein the thickness of the top wall is less than the thickness of the side wall.

16. The optical element drive mechanism as claimed in claim 14, wherein the thickness of the top wall is between 0.10 mm and 0.55 mm, and the thickness of the side wall is between 0.15 mm and 0.60 mm.

17. The optical element drive mechanism as claimed in claim 1, wherein the side wall comprises a non-metal material, the strengthening assembly comprises a metal material, and the strengthening assembly is disposed in the side wall.

18. The optical element drive mechanism as claimed in claim 17, wherein the strengthening assembly comprises a plurality of particle-structured strengthening elements embedded in the side wall.

19. The optical element drive mechanism as claimed in claim 18, wherein a maximum size of each of the particle-structured strengthening elements is less than 0.05 mm, and a ratio of a total volume of the particle-structured strengthening elements to a volume of the side wall is between 5% and 40%.

20. The optical element drive mechanism as claimed in claim 1, wherein the case further comprises a second protrusion protruding from the top wall toward the accommodation space, and the drive assembly is disposed on the second protrusion, wherein the strengthening assembly comprises a top plate with a plate structure and parallel with the top wall of the case, and the top plate is located between the drive assembly and the top wall, wherein the first protrusion and the second protrusion are arranged along a first axis, and in the first axis, a minimum distance between the first protrusion and the second protrusion is greater than a maximum size of the top plate, wherein when viewed along the main axis, the top plate is spaced apart from the first protrusion by a gap, and wherein when viewed along the main axis, the top plate is spaced apart from the second protrusion by a gap.

* * * * *